(12) United States Patent
Yamaoka

(10) Patent No.: US 9,630,455 B2
(45) Date of Patent: Apr. 25, 2017

(54) PNEUMATIC TIRE FOR RUNNING ON ROUGH TERRAIN

(71) Applicant: Sumitomo Rubber Industries, Ltd., Kobe-shi, Hyogo (JP)

(72) Inventor: Hiroshi Yamaoka, Kobe (JP)

(73) Assignee: SUMITOMO RUBBER INDUSTRIES LTD., Kobe-Shi (JP)

( * ) Notice: Subject to any disclaimer, the term of this patent is extended or adjusted under 35 U.S.C. 154(b) by 843 days.

(21) Appl. No.: 13/916,092

(22) Filed: Jun. 12, 2013

(65) Prior Publication Data

US 2014/0007996 A1   Jan. 9, 2014

(30) Foreign Application Priority Data

Jul. 6, 2012   (JP) ................... 2012-152822

(51) Int. Cl.
*B60C 11/11*    (2006.01)
*B60C 11/03*    (2006.01)
*B60C 11/13*    (2006.01)

(52) U.S. Cl.
CPC ............ *B60C 11/11* (2013.01); *B60C 11/032* (2013.04); *B60C 2011/036* (2013.04); *B60C 2011/0381* (2013.04); *B60C 2011/133* (2013.04); *B60C 2200/10* (2013.04); *B60C 2200/14* (2013.04)

(58) Field of Classification Search
CPC .................... B60C 11/11; B60C 2011/0381
USPC ................................................. D12/536, 571
See application file for complete search history.

(56) References Cited

U.S. PATENT DOCUMENTS

| | | | | |
|---|---|---|---|---|
| 3,998,256 A | * | 12/1976 | Verdier | B60C 11/032 152/209.1 |
| D678,180 S | * | 3/2013 | Hikita | D12/536 |
| D685,722 S | * | 7/2013 | Hikita | D12/536 |
| 2008/0110541 A1 | * | 5/2008 | Sueishi | B60C 11/11 152/209.15 |
| 2011/0226397 A1 | * | 9/2011 | Hamada | B60C 11/11 152/209.18 |
| 2012/0024440 A1 | * | 2/2012 | Ishida | B60C 11/11 152/209.1 |
| 2014/0041778 A1 | * | 2/2014 | Ichiryu | B60C 11/11 152/209.18 |

FOREIGN PATENT DOCUMENTS

| | | |
|---|---|---|
| JP | 2008-120351 A | 5/2008 |
| WO | WO-01/43958 A1 * | 6/2001 |

* cited by examiner

*Primary Examiner* — Steven D Maki
(74) *Attorney, Agent, or Firm* — Birch, Stewart, Kolasch & Birch, LLP

(57) ABSTRACT

A pneumatic tire for rough terrain comprises a tread portion provided with a plurality of blocks, the blocks comprising a plurality of center blocks arranged in a center region of the tread portion, a plurality of shoulder blocks arranged along each tread edge of the tread portion and a plurality of middle blocks arranged between the center region and the shoulder blocks, each of the center blocks, middle blocks and shoulder blocks comprising a top face and a sidewall face extending radially inward from the peripheral edge of the top face, wherein at least one of the middle blocks and shoulder blocks is a U-shaped block having a lateral slot which extends from an axially outer sidewall face of the block to an axially inner end thereof being terminated within the block.

9 Claims, 7 Drawing Sheets

PNEUMATIC TIRE FOR RUNNING ON ROUGH TERRAIN

BACKGROUND OF THE INVENTION

Field of the Invention

The present invention relates to a pneumatic tire that delivers improved handling feeling while maintaining high grip during cornering and traction performance on rough terrain.

Description of the Related Art

In general, pneumatic tires for off-road vehicles have block tread patterns with a plurality of blocks. Typically block tread patterns have blocks being arranged sparsely, as compared with tires designed for on-road use, in order to obtain grip and traction performance by offering more deeply engagement between blocks and rough terrain such as mud.

Japanese Patent Laid-Open NO. 2008-120351 discloses a pneumatic tire for running on rough terrain which comprises a tread block having a recess on its top face or a sidewall face in order to further improve grip and traction performance on rough terrain.

Since the tread block of the pneumatic tire above, however, has relatively large rigidity in axially outer portion, the tire tends to deliver undesirable handling feeling that has periodically reaction force to a rider during cornering.

SUMMARY OF THE INVENTION

It is therefore, an object of the present invention to provide a pneumatic tire that delivers improved handling feeling while maintaining high grip and traction performance on rough terrain.

According to the present invention, there is provided a pneumatic tire for rough terrain comprising a tread portion provided with a plurality of blocks, said blocks comprising a plurality of center blocks arranged in a center region of the tread portion, a plurality of shoulder blocks arranged along each tread edge of the tread portion and a plurality of middle blocks arranged between the center region and the shoulder blocks, each of said center blocks, middle blocks and shoulder blocks comprising a top face and a sidewall face extending radially inward from the peripheral edge of the top face, wherein at least one of said middle blocks and shoulder blocks is a U-shaped block having a lateral slot which extends from an axially outer sidewall face of the block to an axially inner end thereof being terminated within the block.

Preferably, the top face of the U-shaped block has a circumferential maximum length being larger than an axial maximum length thereof.

Preferably, the peripheral edge of the top face of the U-shaped block comprises an axially outer edge which includes a first axially outer edge, a second axially outer edge, and a slot edge therebetween which extends along the lateral slot, and each of the first axially outer edge and the second axially outer edge inclines axially inward from the slot edge.

Preferably, the peripheral edge of the top face of the U-shaped block comprises an axially inner edge extending along a circumferential direction of the tire, an axially outer edge, a first edge connecting between the axially inner edge and the axially outer edge at one side in the circumferential direction of the tire, and a second edge connecting between the axially inner edge and the axially outer edge at the other side in the circumferential direction of the tire, wherein the axially outer edge includes a first axially outer edge, a second axially outer edge, and a slot edge therebetween which extends along the lateral slot, and each of the first edge and the second edge extends axially outward so as to be apart from each other.

Preferably, the peripheral edge of the top face of the U-shaped block comprises an axially inner edge extending along a circumferential direction of the tire, an axially outer edge, a first edge connecting between the axially inner edge and the axially outer edge at one side in the circumferential direction of the tire, and a second edge connecting between the axially inner edge and the axially outer edge at the other side in the circumferential direction of the tire, wherein a chamfer portion is provided at a first corner between the axially inner edge and the first edge, and a second corner between the axially inner edge and the second edge.

Preferably, the chamfer portion in the top face is formed as a concave arc which protrudes inwardly of the U-shaped block, and the concave arc has a radius of curvature in a range of from not more than 2 mm.

Preferably, the lateral slot has a width at the top face in a range of from 0.10 to 0.30 times of a circumferential maximum length of the U-shaped block.

Preferably, the lateral slot has an axial length at the top face in a range of from 0.15 to 0.50 times of an axial maximum length of the U-shaped block.

Preferably, the middle blocks include a plurality of U-shaped middle blocks, the shoulder blocks along each tread edge include a plurality of U-shaped shoulder blocks, and the U-shaped middle blocks and the U-shaped shoulder blocks are arranged alternately in a circumferential direction of the tire.

DESCRIPTION OF THE PREFERRED EMBODIMENTS

Embodiment of the present invention will now be described in detail in conjunction with accompanying drawings.

Figure 1:
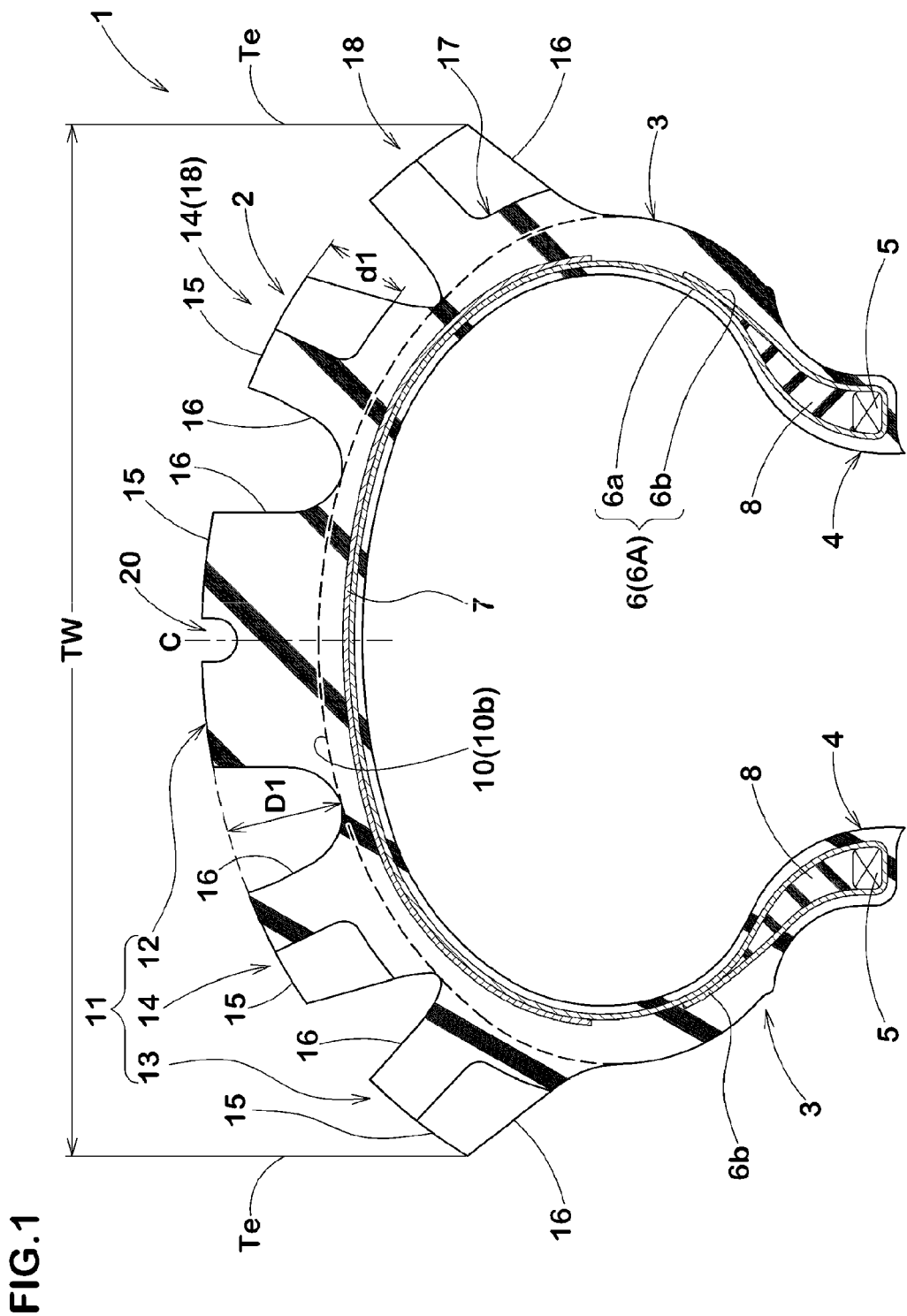
FIG. 1 is a cross sectional view of a pneumatic tire for running on rough terrain as an embodiment of the present invention.

FIG. 1 shows a pneumatic tire 1 as an embodiment of the present invention which is illustrated as an off-road motorcycle tire being designed for suitably running on rough terrain such as sand or muddy road with high performance. The tire 1 shown in FIG. 1 is a cross sectional view of a tire which is under a normally inflated unloaded condition of the tire. Additionally, the cross section shown in FIG. 1 corresponds to a cross section taken along line A-A of FIG. 2.

Here, the normally inflated unloaded condition is such that the tire is mounted on a standard wheel rim and inflated to a standard pressure but loaded with no tire load.

The standard wheel rim means a wheel rim officially approved or recommended for the tire by standards organizations, i.e. JATMA (Japan and Asia), T&RA (North America), ETRTO (Europe) and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure means the maximum air pressure for the tire specified by the same organization in the Airpressure/Maximum-load Table or similar list. The standard pressure is the "maximum air pressure" in JATMA, the "Inflation Pressure" in ETRTO, and the maximum pressure given in the "Tire Load Limits at various cold Inflation Pressures" table in TRA or the like.

In this application including specification and claims, various dimensions, positions and the like of the tire refer to the normally inflated unloaded condition of the tire unless otherwise noted.

The tire 1 for running on rough terrain in accordance with the present invention comprises a tread portion 2, a pair of bead portions 4 each with a bead core 5, a pair of sidewall portions 3 extending from the tread portion 2 to the bead portions 4, a carcass 6 extending between the bead portions 4 through the tread portion 2 and sidewall portions 3, and a tread reinforcing layer 7 disposed radially outwardly of the carcass 6 in the tread portion 2.

As a characteristic of a motorcycle tire, the tread portion 2 is convexly curved so that the tread face between the tread edges Te, Te is curved like an arc swelling radially outwardly, and the maximum cross sectional width of the tire 1 occurs between the tread edges Te, namely, equals to the axial tread width TW.

The carcass 6 is composed of at least one ply 6A of carcass cords extending between the bead portions 4 through the tread portion 2 and sidewall portions 3. In this embodiment, the ply 6A comprises a main portion 6a extending between the bead portions 4, and a pair of turned-up portions 6b each turned up around the bead core 5 from axially inside to the outside of the tire. A bead apex 8 made of hard rubber which extends and tapers from the bead core 5 is disposed between the main portion 6a and the turned-up portion 6b in order to enhance the rigidity of bead portion 4.

The tread portion 2 is provided with a plurality of blocks 11 arranged sparsely. Each block 11 protrudes from the bottom 10b of the sea area 10 of the tread portion 2. As shown in FIG. 1, the bottom 10b of the sea area 10 of the tread portion 2 has a profile which is curved similarly to the profile of the outer surface of the carcass 6. In this embodiment, the depth D1 of the sea area 10 is in a range of from 7 to 19 mm, for example. Here, the "sea area" means the area surrounding the blocks 11 and corresponding to the "grooved area" of the tread portion of a tire for passenger cars, truck/bus and the like.

The block 11 comprise a plurality of center blocks 12 arranged in a center region Cr of the tread portion 2, a plurality of shoulder blocks 13 arranged in a pair of shoulder regions sh each extending along tread edge Te of the tread portion 2, and a plurality of middle blocks 14 arranged in a pair of middle regions Md each of which is between the center region Cr and the shoulder region Sh. Each of blocks 12, 13, 14 has a top face 15 and a sidewall face 16 extending radially inwardly of the tire from the peripheral edge of the top face 15.

Figure 2:
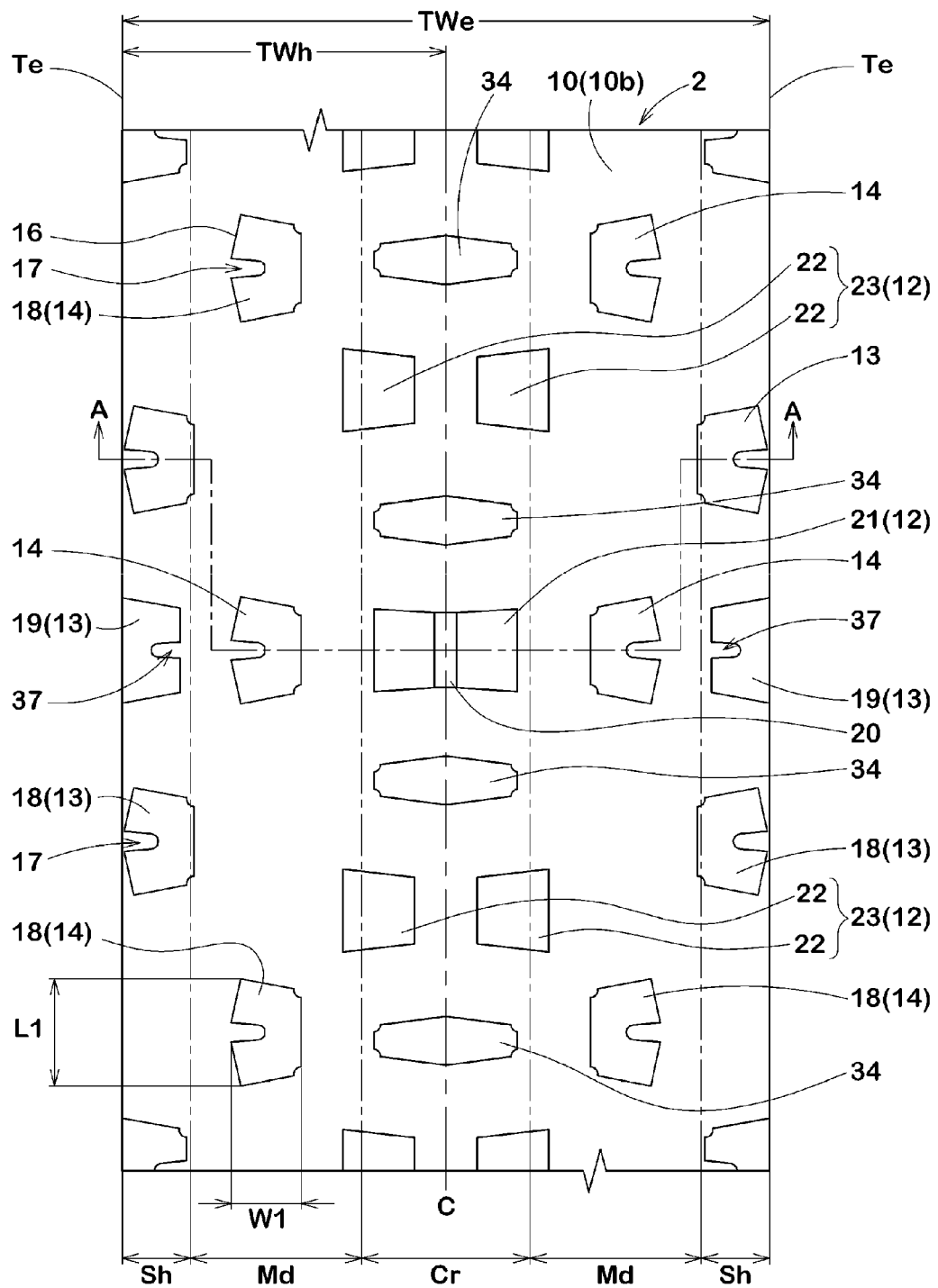
FIG. 2 is a development view of a tread portion of FIG. 1.

Referring to FIG. 2, the center region Cr is a region having a 25% developed width of a tread developed width Twe with its center on the tire equator C. Here, a developed width with respect to the tread portion 2 means a length measured along the tread face. Each center block 12 has at least 60% area of the top face 15 included within the center region Cr.

In this embodiment, center blocks 12 comprise at least one primary block 21, and a plurality of secondary blocks 22 to form a block unit 23. The primary block 21 which has an axially long rectangular shape being arranged on the tire equator C and is provided a circumferentially extending slit 20 on its axially center portion. The block unit 23 includes a pair of secondary blocks 23 being symmetrically arranged on both sides of the tire equator c. The primary block 21 and the block unit 23 are alternately arranged in the circumferential direction of the tire. Preferably, a recess 34 is provided on the bottom 10b of the sea area 10 between the primary block 21 and the block unit 23. Such arrangement of primary blocks 21, secondary blocks 22 and the recess 34 in the center region CR helps to improve self cleaning feature of the sea area 10 that prevents mud from sticking to the sea area 10 of the tread portion 2 to get high grip performance on mud condition.

The shoulder region Sh is a region having a 20% developed width of a half tread developed width Twh from each of the tread edge Te. The shoulder block 13 has at least 60% area of the top face 15 included within the shoulder region sh. Here, the half tread developed width Twh is a developed width of the tread portion 2 measured from the tire equator to one of tread edges Te.

The middle region Md is a region between the center region Cr and the shoulder region Sh. The middle block 14 has at least 60% area of the top face 15 included within the middle region Md.

At least one of middle blocks 14 and shoulder blocks 13 is a U-shaped block 18 which has a lateral slot 17 extending from an axially outer sidewall face 16 of the block to an axially inner end 17r thereof being located within the block. The U-shaped block 18 has a U-shaped or v-shaped top face 15 in this embodiment.

Figure 3:
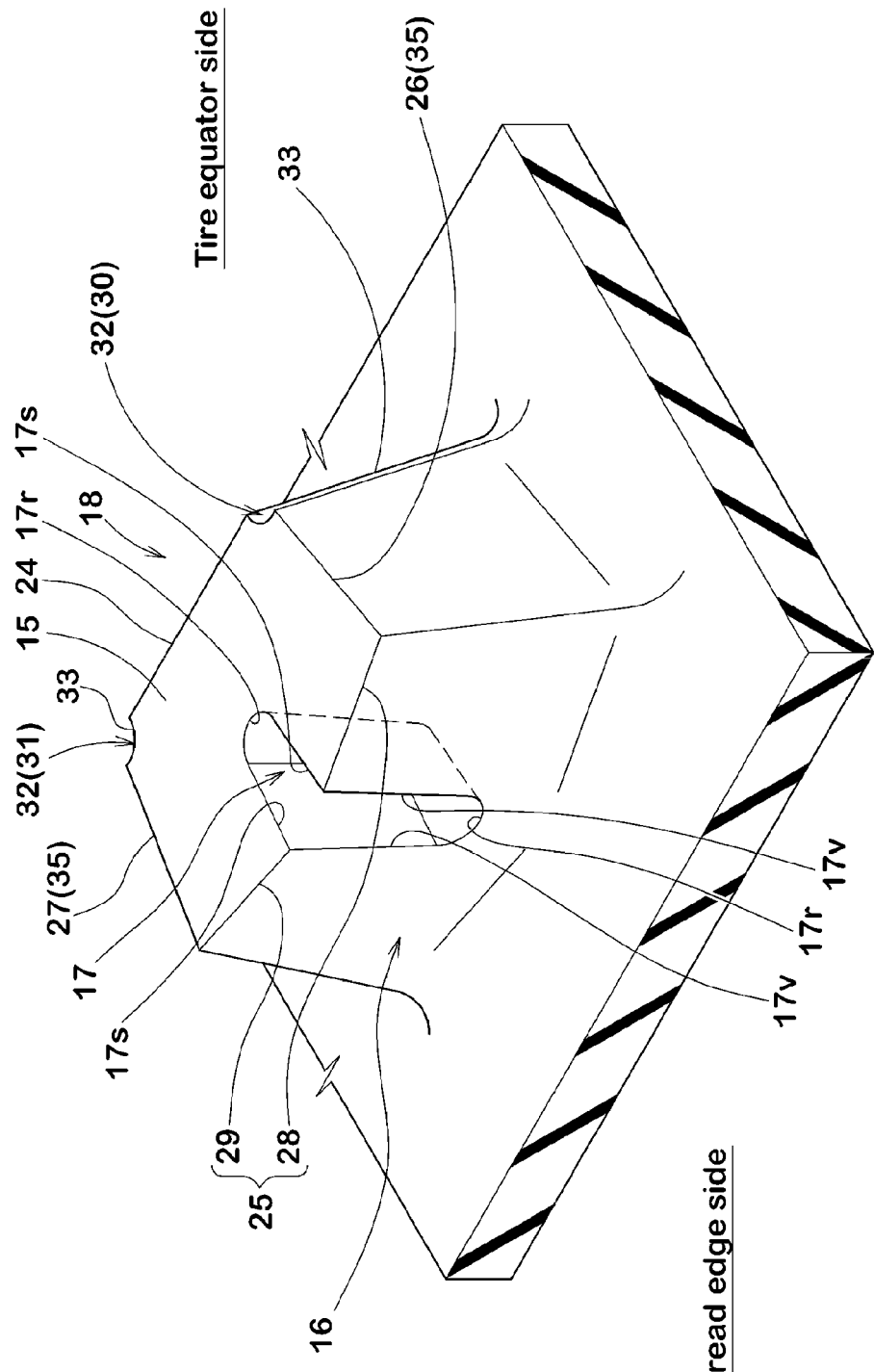
FIG. 3 is an enlarged perspective view of a U-shaped block of FIG. 1.
Figure 4:
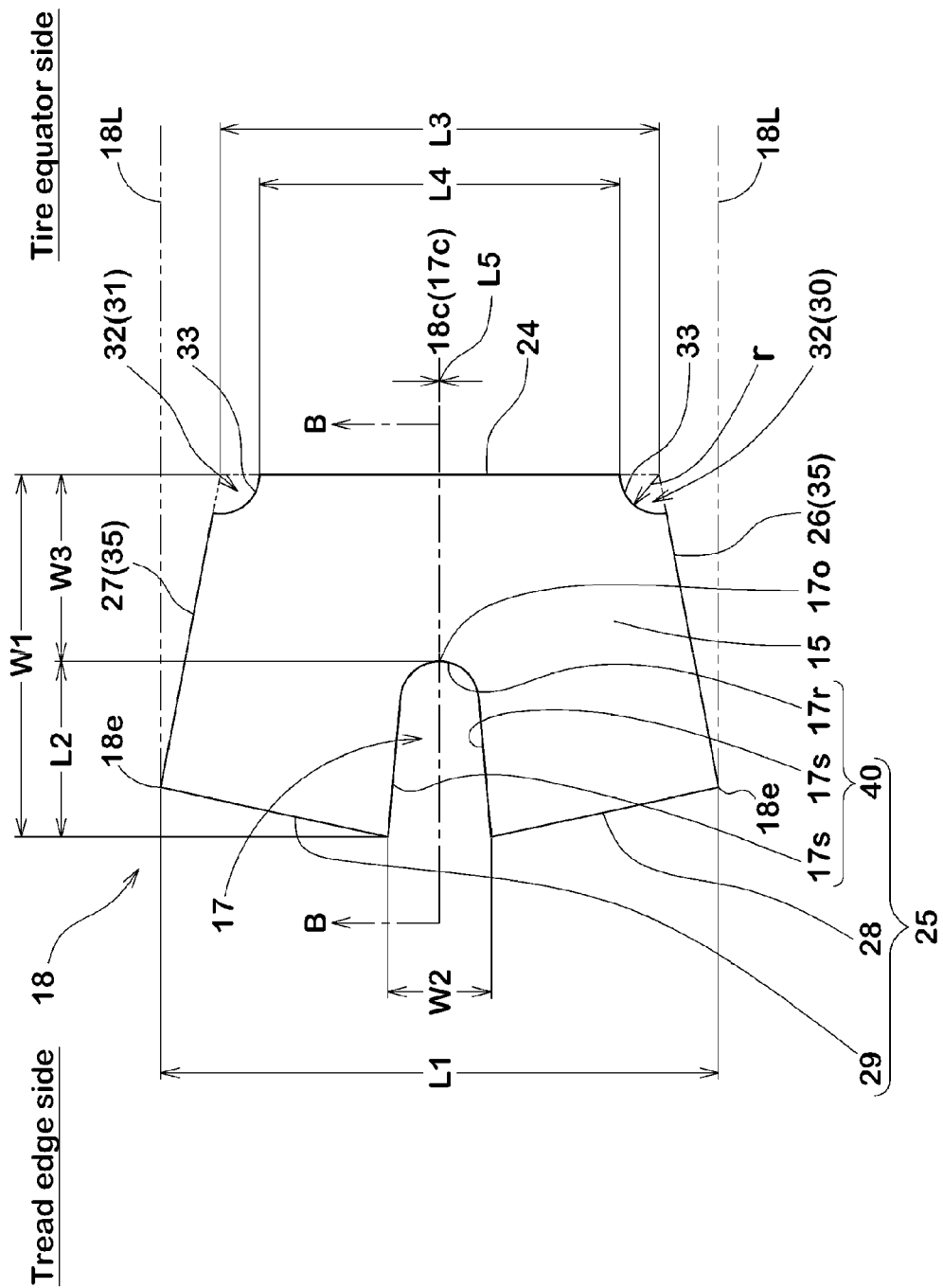
FIG. 4 is a plan view of the U-shaped block.
Figure 5:
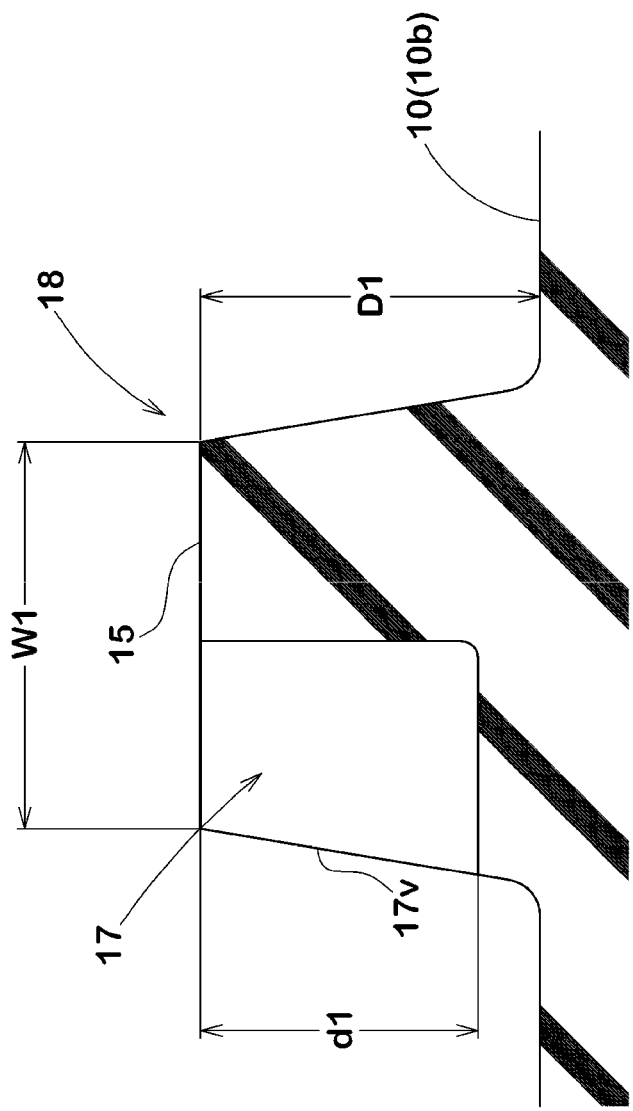
FIG. 5 is a cross sectional view taken along line B-B in FIG. 4.

FIG. 3 shows a perspective view of the U-shaped block 18, FIG. 4 shows the enlarged top face 15 of the U-shaped block 18 and FIG. 5 shows a cross sectional view of taken line B-B in FIG. 4. Referring to FIGS. 3 to 5, the U-shaped block is provided with the lateral slot 17 on its circumferentially center portion. The lateral slot 17 terminates within the block.

Since the U-shaped block 18 has increased edges length due to the lateral slot 17, high grip and traction performance on rough terrain during cornering may be maintained. Additionally, since the U-shaped block 18 has an axially outer portion with softened rigidity, the tire in accordance with the present invention tends to deliver desirable handling feeling without periodically reaction force to a rider during cornering.

Preferably, the lateral slot 17 is preferably provided in a circumferentially center region of the U-shaped block 18 in order to prevent the block 18 from damage such as tipping or the like, while maintaining reducing rigidity of the axially outer portion of the block 18. Referring to FIG. 4, the lateral slot 17 preferably has a slot centerline 17c being on the axially extending centerline 18c of the U-shaped block 18 in this embodiment. In another aspect of the present invention, the slot centerline 17c may be away from the axially extending centerline 18c of the U-shaped block 18 within a distance L5 that is not more than 25%, more preferably not more than 5% of the circumferential maximum length L1 of the U-shaped block 18. Here, the axially extending centerline 18c of the U-shaped block 18 is defined as an axially extending line which divides an area that is between two axial lines passing at the circumferentially outmost points 18e of U-shaped block 18 into two equal parts.

Referring to FIGS. 3 to 4, the peripheral edge of the top face 15 of the U-shaped block 18 comprises an axially inner edge 24 extending along a circumferential direction of the tire at the side of the tire equator C, an axially outer edge 25 extending at the side of the tread edge Te, and axially extending edges 35 each of which connects between the axially inner and outer edges 24, 25.

In order to increase grip of tire due to lateral friction force against the road during cornering, the inner edge 24 preferably extends in straight along the circumferential direction of the tire.

The axially extending edge 35 includes a first edge 26 arranged at one side in the circumferential direction of the tire, and a second edge 27 arranged at the other side in the circumferential direction of the tire. In this embodiment, each of the first edge 26 and the second edge 27 extends axially outward so as to be apart from each other so that the axially outer 25 has a larger circumferential length. Additionally, since the first edge 26 and the second edge 27 has opposed inclination with respect to the axial direction of the tire with the same angle, the tire 1 may offer the good ground contacting feeling on the road when it is subjected to accelerate as well as to brake.

The axially outer edge 25 includes a first axially outer edge 28 which extends from the lateral slot 17 toward the first edge 26 with an inclination toward the tire equator C, a second axially outer edge 29 which extends from the lateral slot 17 toward the second edge 27 with an inclination toward the tire equator C, and a slot edge 40 which is the peripheral edge of the lateral slot 17 on the top face 15. Preferably, the first axially outer edge 28 and second axially outer edge 29 are symmetrically arranged with respect to the axially extending centerline 18c of the U-shaped block 18, whereby the tire 1 may offer the good contacting feeling on the road when it is subjected to accelerate as well as to brake.

Preferably, the top face 15 of the U-shaped block 18 has the circumferential maximum length L1 being larger than the axial maximum length W1 thereof. Namely, the U-shaped block 18 in this embodiment has a longitudinally long shape so that grip of the tire during cornering may be improved by increasing circumferential extending edges. Preferably, the circumferential maximum length L1 of the top face 15 is in a range of from 9 to 30 mm. Preferably, the axial maximum length W1 of the top face 15 is in a range of from 10 to 30 mm.

Preferably, the slot centerline 17c of the lateral slot 17 extends at angle not more than 10 degrees with respect to the axial direction of the tire in order to soften axially outside of the U-shaped block so as to have a well-balanced rigidity thereof.

Referring to FIG. 4, the lateral slot 17 preferably has a width W2 in a range of from 0.10 to 0.30 times the circumferential maximum length L1 in order to improve handling feeling while preventing the U-shaped block 18 from damage such as tipping or the like. More preferably, the width W2 is in a range of not more than 0.20 times the maximum length L1. Here, the width W2 of the lateral slot 17 means the maximum width thereof.

In the same view as above, the lateral slot 17 preferably has the axial length L2 in a range of not less than 0.15 times, more preferably not less than 0.30 times, but preferably not more than 0.50 times, more preferably not more than 0.35 times the axial maximum length L2 of the U-shaped block 18.

Preferably, the length L2 of the lateral slot 17 is smaller than an axially width W3 of a remained portion of the U-shaped block 18 between the axially inner end 17o of the lateral slot 17 and the axially inner edge 24 of the top face 15, whereby improves grip and traction performance of the tire during cornering as well as durability of the U-shaped block 18 by offering sufficiently solidity of the U-shaped block 18.

Referring to FIG. 5, the lateral slot 17 preferably has a depth d1 in a range of from not less than 0.60 times, more preferably not less than 0.70 times, but preferably not more than 0.90 times, more preferably not more than 0.80 times the groove depth D1 of the sea area 10 of the tread portion in order to improve handling feeling without deteriorating traction performance of the tire due to softened rigidity of the U-shaped block 18.

Referring to FIG. 3, the lateral slot 17 provides the top face 15 with lateral edge elements 17s, 17s. The lateral slot 17 also provides the sidewall face 16 with vertical edges 17v extending radially inwardly from the top face 15. Such straightly extending lateral and vertical edges 17s, 17v provide high friction force on the rough terrain during traveling while preventing insertion of small stones therein. Preferably, the lateral edges 17s, 17s of the lateral slot 17 extend axially outwardly while increasing the distance between them. Preferably, the vertical edges 17v, 17v of the lateral slot 17 extend radially outward while increasing the distance therebetween.

The lateral edges 17s, 17s are connected by an arc edge 17r. The vertical edges 17v, 17v are also connected by an arc edge 17r. In the event that the U-shaped block 18 deforms, the arc edge 17r helps to reduce stress concentration on the bottom of the lateral slot 17.

The U-shaped block 18 preferably has a plurality of vertically extending edge elements on the sidewall face 16. Preferably, the U-shaped block 18 is provided with a chamfered portion 32 at least one corner of the top face 15 in order to prevent the block from damage such as chipping or the like. In this embodiment, the corner 30 between the first edge 26 and the axially inner edge 24 of the top face 15, and the corner 31 between the second edge 27 and the axially inner edge 24 of the top face 15 are provided with the chamfer portion 32.

Preferably, the chamfered portion 32 in the top face 15 is formed as a concave arc with a radius r of curvature in a range of not more than 2 mm which protrudes toward the internal of the block. The chamfered portion 32 provides the U-shaped block 18 with a dent 33 extending radially inward of the tire from the top face 15. The dent 33 helps to scoop mud so as to improve grip and traction performance on soft rough terrain.

Referring to FIG. 4, in order to improve grip during cornering as well as the scoop action of the dent 33 above, the axially inner edge 24 preferably has a length L4 in a range of not less than from 0.60 times, more preferably not less than 0.65 times, but preferably not more than 0.80 times, more preferably not more than 0.75 times the gross length L3 of the axially inner edge 24. Here, the gross length L3 means a length of the axially inner edge 24 prior to be provided with the chamfered portion 32.

Preferably, the gross length L3 of the axially inner edge 24 is set in a range of from not less than 0.75 times, more preferably not less than 0.80 times, but preferably not more than 1.00 times, more preferably not more than 0.90 times the circumferential maximum length L1 of the U-shaped block 18 in order to improve grip performance during cornering.

Preferably, U-shaped blocks 18 are employed for whole middle blocks shown in FIG. 2, in order to maintain advantages from the initial stage to final of cornering.

The shoulder blocks 13 include the U-shaped block 18 and a second block 19 which has a lateral slot 37 extending axially outward of the tire. Such a shoulder block arrangement helps to improve operating feeling when the leaned tire is returned back while improving grip performance at a large banked state of the tire.

Preferably, the U-shaped blocks 18 provided in the middle region Md and the U-shaped blocks 18 provided in the shoulder region Sh are alternately arranged in the circumferential direction of the tire. Such an arrangement of U-shaped blocks 18 makes it possible to improve self cleaning feature of the sea area 10 that prevents mud from sticking to the sea area 10 of the tread portion 2 to get high grip and traction performance on mud condition.

The present invention is more specifically described and explained by means of the following Examples and References. It is to be understood that the present invention is not limited to these Examples.

Comparison Tests

Motorcycle tires for a front wheel having the internal structure shown in FIG. 1 and the tread pattern shown in FIG. 2 except for the details specifications shown in Table 1 were prepared and tested. Additionally, comparative tires (Ref. 1 to 3) were prepared and tested. Comparative tires have the same internal structure shown in FIG. 1 and the tread pattern shown in FIG. 2 except for the block configuration as follows.

Figure 6A:
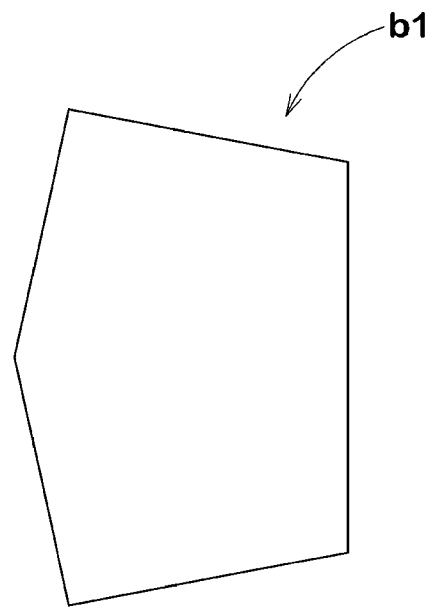
FIGS. 6A and 6B are enlarged plan views of reference blocks.

Ref. 1 has tread blocks b1 without the lateral slot and the chamfered portion, shown in FIG. 6A.

Figure 6B:
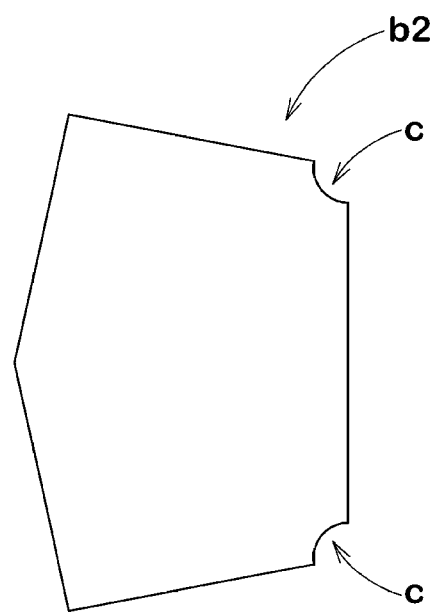

Ref. 2 has tread blocks b2 with chamfered portions c and without the lateral slot, shown in FIG. 6B.

Figure 7A:
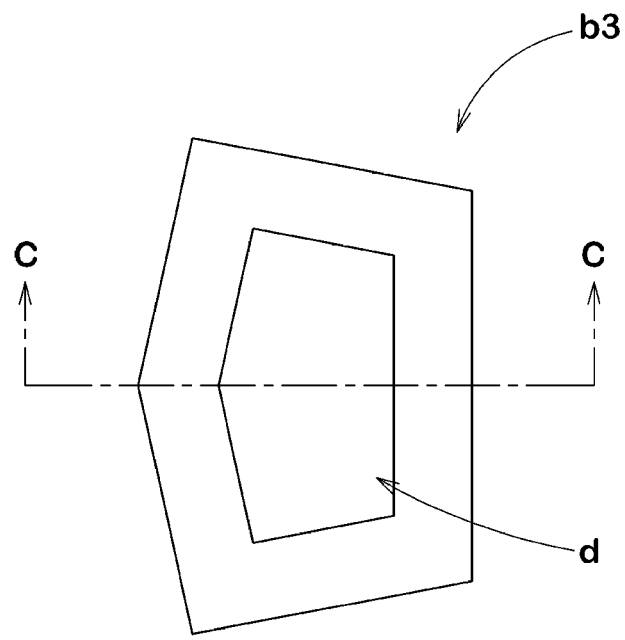
FIG. 7A is an enlarged plan view of another reference block.
Figure 7B:
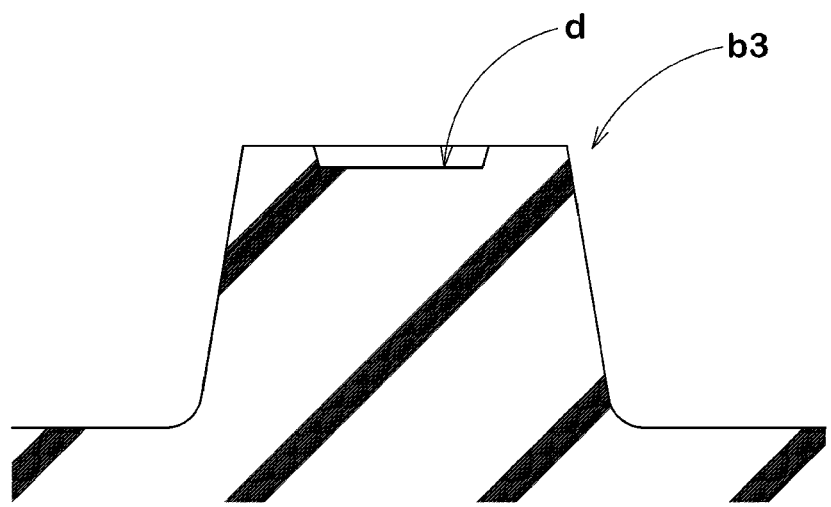
FIG. 7B is a cross sectional view taken along line C-C in FIG. 7A.

Ref. 3 has tread blocks b3 with a recess d on the top face and without the chamfered portion and the lateral slot, shown in FIGS. 7A and 7B.

The Major specifications of the tires and rims are as follows.

Tire Size
  Front: 80/100-21 21
  Rear: 120/80-19 19
Rim Size
  Front: 21×1.60
  Rear: 19×2.15
Internal Pressure
  Front: 80 kPa
  Rear: 80 kPa Test method is as follows.

Grip During Cornering, Traction, Handling Feeling and Ease to Operate Test:

In the test, using a 450 cc motocross bike, a test rider evaluated test tires as for grip during cornering, traction, handling feeling, and ease to operate based on his feeling during running on a motocross course. The results are indicated in Table 1 by a score based on comparative tire (Ref. 3) being 100, wherein the larger the value, the better the performance is.

As described above, it was confirmed that the pneumatic tire according to the present delivered improved handling feeling while maintaining high grip and traction performance on rough terrain.

TABLE 1

|  | Ref. 1 | Ref. 2 | Ref. 3 | Ex. 1 | Ex. 2 | Ex. 3 | Ex. 4 | Ex. 5 | Ex. 6 |
|---|---|---|---|---|---|---|---|---|---|
| Lateral slot | Absence | Absence | Absence | Provided | Provided | Provided | Provided | Provided | Provided |
| Recess on top face | Absence | Absence | Provided | Absence | Absence | Absence | Absence | Absence | Absence |
| Axial maximum length W1 of top face (mm) | 9.5 | 9.5 | 9.5 | 9.5 | 9.5 | 9.5 | 9.5 | 9.5 | 9.5 |
| Circumferential maximum length L1 of top face (mm) | 14 | 14 | 14 | 14 | 14 | 14 | 14 | 14 | 14 |
| Lateral slot width W2 (mm) | — | — | — | 3 | 3 | 3 | 1.5 | 4 | 3 |
| Lateral slot length L2 (mm) | — | — | — | 4.75 | 4.75 | 4.75 | 4.75 | 4.75 | 2 |
| Gross length L3 of axially inner edge (mm) | 11 | 11 | 11 | 11 | 11 | 11 | 11 | 11 | 11 |
| Axially inner edge length L4 (mm) | — | 8 | — | 8 | 8 | 9 | 8 | 8 | 8 |
| Distance L5 (mm) | — | — | — | 0 | 0 | 0 | 0 | 0 | 0 |
| Chamfered portion at block corner | Absence | Provided | Absence | Provided | Provided | Provided | Provided | Provided | Provided |
| Radius of curvature of chamfered portion (mm) | — | 1.5 | — | 1.5 | 2 | 1 | 1.5 | 1.5 | 1.5 |
| Grip during cornering (Score) | 85 | 90 | 100 | 100 | 98 | 98 | 100 | 100 | 98 |
| Traction (Score) | 85 | 90 | 100 | 100 | 98 | 100 | 100 | 97 | 98 |
| Handling feeling (Score) | 100 | 100 | 100 | 110 | 110 | 110 | 107 | 110 | 108 |
| Ease to operate (Score) | 100 | 100 | 100 | 110 | 110 | 110 | 107 | 110 | 108 |

|  | Ex. 7 | Ex. 8 | Ex. 9 | Ex. 10 | Ex. 11 | Ex. 12 | Ex. 13 | Ex. 14 |
|---|---|---|---|---|---|---|---|---|
| Lateral slot | Provided | Provided | Provided | Provided | Provided | Provided | Provided | Provided |
| Recess on top face | Absence | Absence | Absence | Absence | Absence | Absence | Absence | Absence |
| Axial maximum length W1 of top face (mm) | 9.5 | 9.5 | 9.5 | 9.5 | 9.5 | 9.5 | 9.5 | 9.5 |
| Circumferential maximum length L1 of top face (mm) | 14 | 14 | 14 | 14 | 14 | 14 | 14 | 14 |
| Lateral slot width W2 (mm) | 3 | 3 | 3 | 1 | 6 | 3 | 3 | 3 |
| Lateral slot length L2 (mm) | 4.75 | 4.75 | 4.75 | 4.75 | 4.75 | 1 | 7 | 4.75 |
| Gross length L3 of axially inner edge (mm) | 11 | 11 | 11 | 11 | 11 | 11 | 11 | 11 |
| Axially inner edge length L4 (mm) | 8 | 8 | 10 | 8 | 8 | 8 | 8 | 8 |
| Distance L5 (mm) | 0 | 0 | 0 | 0 | 0 | 0 | 0 | 3 |

TABLE 1-continued

| | | | | | | | | |
|---|---|---|---|---|---|---|---|---|
| Chamfered portion at block corner | Absence | Provided | Provided | Provided | Provided | Provided | Provided | Provided |
| Radius of curvature of chamfered portion (mm) | — | Infinity | 1.5 | 1.5 | 1.5 | 1.5 | 1.5 | 1.5 |
| Grip during cornering (Score) | 95 | 98 | 98 | 97 | 102 | 95 | 100 | 100 |
| Traction (Score) | 95 | 98 | 98 | 98 | 95 | 95 | 95 | 97 |
| Handling feeling (Score) | 110 | 110 | 110 | 105 | 112 | 105 | 110 | 105 |
| Ease to operate (Score) | 110 | 110 | 110 | 105 | 112 | 105 | 110 | 105 |

The invention claimed is:

1. A pneumatic tire for rough terrain comprising:
a tread portion provided with a plurality of blocks, said blocks comprising a plurality of center blocks arranged in a center region of the tread portion, a plurality of shoulder blocks arranged along each tread edge of the tread portion and a plurality of middle blocks arranged between the center region and the shoulder blocks;
each of said center blocks, middle blocks and shoulder blocks comprising a top face and a sidewall face extending radially inward from the peripheral edge of the top face;
at least one of said middle blocks comprising a U-shaped block having a lateral slot which extends from an axially outer sidewall face of the block to an axially inner end thereof being terminated within the block, wherein the lateral slot is not provided with any projections therein;
the peripheral edge of the top face of the U-shaped block comprising an axially inner edge extending along a circumferential direction of the tire, an axially outer edge, a first edge connecting between the axially inner edge and the axially outer edge at one side in the circumferential direction of the tire, and a second edge connecting between the axially inner edge and the axially outer edge at the other side in the circumferential direction of the tire, wherein the axially outer edge includes a first axially outer edge, a second axially outer edge, and a slot edge therebetween which extends along the lateral slot; and
each of the first edge and the second edge inclining in an opposite direction with respect to an axial direction of the tire so as to be apart from each other toward the tread edge.

2. A pneumatic tire for rough terrain comprising:
a tread portion provided with a plurality of blocks, said blocks comprising a plurality of center blocks arranged in a center region of the tread portion, a plurality of shoulder blocks arranged along each tread edge of the tread portion and a plurality of middle blocks arranged between the center region and the shoulder blocks;
each of said center blocks, middle blocks and shoulder blocks comprising a top face and a sidewall face extending radially inward from the peripheral edge of the top face;
at least one of said middle blocks comprising a U-shaped block having a lateral slot which extends from an axially outer sidewall face of the block to an axially inner end thereof being terminated within the block, wherein the lateral slot is not provided with any projections therein; and
the peripheral edge of the top face of the U-shaped block comprising an axially inner edge extending along a circumferential direction of the tire, an axially outer edge including a first axially outer edge, a second axially outer edge, and a slot edge therebetween extending along the lateral slot, a first edge connecting between the axially inner edge and the axially outer edge at one side in the circumferential direction of the tire, and a second edge connecting between the axially inner edge and the axially outer edge at the other side in the circumferential direction of the tire, wherein each of the first axially outer edge and the second axially outer edge inclines axially inward from the slot edge, and wherein each of the first edge and the second edge inclines in an opposite direction with respect to an axial direction of the tire so as to be apart from each other toward the tread edge.

3. A pneumatic tire for rough terrain comprising:
a tread portion provided with a plurality of blocks, said blocks comprising a plurality of center blocks arranged in a center region of the tread portion, a plurality of shoulder blocks arranged along each tread edge of the tread portion and a plurality of middle blocks arranged between the center region and the shoulder blocks;
each of said center blocks, middle blocks and shoulder blocks comprising a top face and a sidewall face extending radially inward from the peripheral edge of the top face; and
at least one of said middle blocks comprising a U-shaped block having a lateral slot which extends from an axially outer sidewall face of the block to an axially inner end thereof being terminated within the block,
wherein
the lateral slot is not provided with any projections therein,
the top face of the U-shaped block having a circumferential maximum length being larger than an axial maximum length thereof, and
the peripheral edge of the top face of the U-shaped block comprises an axially inner edge extending along a circumferential direction of the tire, an axially outer edge, a first edge connecting between the axially inner edge and the axially outer edge at one side in the circumferential direction of the tire, and a second edge connecting between the axially inner edge and the axially outer edge at the other side in the circumferential direction of the tire, and
wherein
the axially outer edge includes a first axially outer edge, a second axially outer edge, and a slot edge therebetween which extends along the lateral slot, and
each of the first edge and the second edge inclines in an opposite direction with respect to an axial direction of the tire so as to be apart from each other toward the tread edge.

4. The tire according to claim 3, wherein
each of the first axially outer edge and the second axially outer edge inclines axially inward from the slot edge.

5. The tire according to claim 3, wherein
a chamfer portion is provided at a first corner between the axially inner edge and the first edge, and a second corner between the axially inner edge and the second edge.

6. The tire according to claim 5, wherein
the chamfer portion in the top face is formed as a concave arc which protrudes inwardly of the U-shaped block, and
the concave arc has a radius of curvature in a range of from not more than 2 mm.

7. The tire according to claim 3, wherein
the lateral slot has a width at the top face in a range of from 0.10 to 0.30 times of a circumferential maximum length of the U-shaped block.

8. The tire according to claim 3, wherein
the lateral slot has an axial length at the top face in a range of from 0.15 to 0.50 times of an axial maximum length of the U-shaped block.

9. The tire according to claim 3, wherein
said middle blocks include a plurality of U-shaped middle blocks,
said shoulder blocks along each tread edge include a plurality of U-shaped shoulder blocks, and
the U-shaped middle blocks and the U-shaped shoulder blocks are arranged alternately in a circumferential direction of the tire.

* * * * *